(12) United States Patent
Zhu et al.

(10) Patent No.: US 8,631,712 B2
(45) Date of Patent: Jan. 21, 2014

(54) METHOD FOR DETECTING PLUGGING IN A CORIOLIS FLOW MEASURING DEVICE

(75) Inventors: Hao Zhu, Freising (DE); Wolfgang Drahm, Erding (DE); Alfred Rieder, Landshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 215 days.

(21) Appl. No.: 13/227,653

(22) Filed: Sep. 8, 2011

(65) Prior Publication Data

US 2012/0060626 A1 Mar. 15, 2012

(30) Foreign Application Priority Data

Sep. 10, 2010 (DE) .......................... 10 2010 040 600

(51) Int. Cl.
*G01F 1/84* (2006.01)
(52) U.S. Cl.
USPC .................................................... 73/861.354
(58) Field of Classification Search
USPC .................................. 73/861.354–861.357
See application file for complete search history.

(56) References Cited

U.S. PATENT DOCUMENTS

| | | | |
|---|---|---|---|
| 6,293,158 B1 * | 9/2001 | Ollila et al. | 73/861.355 |
| 8,359,933 B2 * | 1/2013 | Drahm et al. | 73/861.357 |
| 2005/0132808 A1 | 6/2005 | Brown | |
| 2008/0141789 A1 | 6/2008 | Kassubek | |
| 2010/0175456 A1 | 7/2010 | Stack et al. | |

FOREIGN PATENT DOCUMENTS

| | | |
|---|---|---|
| DE | 102006039726 A1 | 2/2008 |
| JP | 9178610 A | 7/1997 |
| JP | 2009074571 A | 4/2009 |
| WO | WO 2008/111983 | 9/2008 |
| WO | WO 2009/134268 | 11/2009 |

OTHER PUBLICATIONS

International Search Report issued in corresponding International Application No. PCT/EP2011/063651 dated Oct. 27, 2011.
International Preliminary Report on Patentability in PCT/EP2011/063651, issued Mar. 12, 2013, English translation thereof.
German Search Report in corresponding German Application No. 10 2010 040 600.7.

* cited by examiner

*Primary Examiner* — Jewel V Thompson
(74) *Attorney, Agent, or Firm* — Bacon & Thomas, PLLC

(57) ABSTRACT

A method for detecting complete or partial plugging of a measuring tube of a Coriolis flow measuring device, which is insertable into a pipeline, and which has a measuring transducer of the vibration type having at least two measuring tubes connected for parallel flow. The method includes, in such case, the steps of measuring a subset flow occurring in a subset of the measuring tubes, and comparing a subset flow value obtained from this measurement with a reference value to be expected for this subset. The reference value is, in such case, determined from a total mass flow determined in the context of a Coriolis mass flow measuring. Additionally, the method includes the step of detecting plugging of at least one measuring tube of the measuring transducer, if the subset flow value deviates from the reference value by more than a limit value.

15 Claims, 4 Drawing Sheets

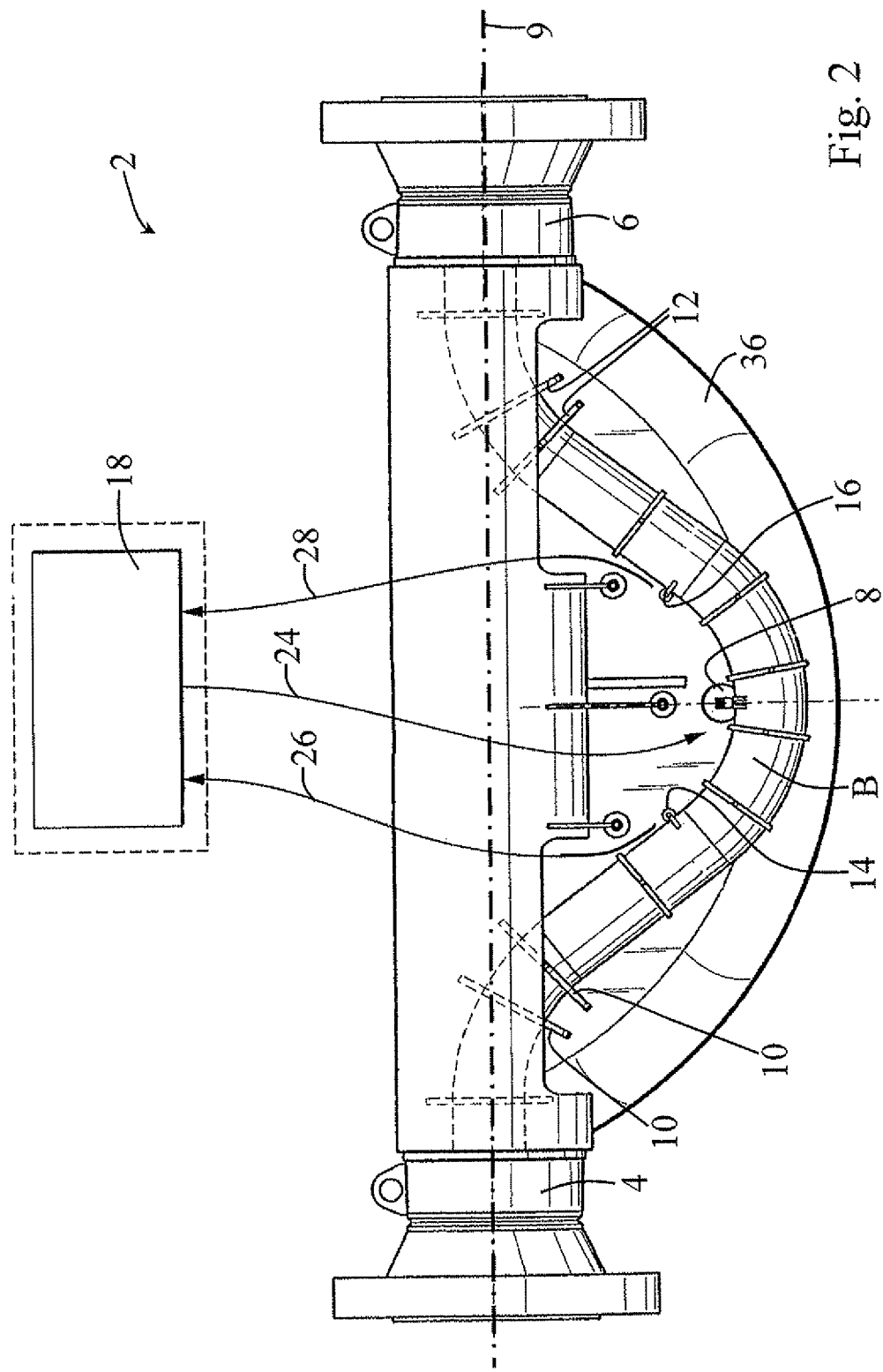

METHOD FOR DETECTING PLUGGING IN A CORIOLIS FLOW MEASURING DEVICE

TECHNICAL FIELD

The present invention relates to a method for detecting complete or partial plugging of a measuring tube of a Coriolis flow measuring device, which is insertable into a pipeline, and which has a measuring transducer of vibration type having at least two measuring tubes connected for parallel flow. The invention additionally relates to a correspondingly embodied, Coriolis flow measuring device.

BACKGROUND DISCUSSION

According to the Coriolis principle, whenever, in a system, a rotating mass movement and a straight line mass movement extending at least partially perpendicular to the rotational axis superimpose, an additional force always acts on the moved mass; this force is referred to as the Coriolis force. This effect is utilized in known manner in Coriolis flow measuring devices, for example, in order to determine mass flow of a medium flowing in a pipeline. During use, such Coriolis flow measuring devices are inserted, as so called inline-measuring devices, into a pipeline flowed through by the respective medium.

Frequently, measuring transducers are applied in Coriolis flow measuring devices which have two measuring tubes connected for parallel flow, between which a medium flowing in the pipeline is divided. As a rule, during use, the two measuring tubes are excited with opposite phase to one another. In this way, a decoupling of the oscillatory system, which has the two measuring tubes, from external vibration influences is achieved. Additionally, a measuring transducer of a Coriolis flow measuring device can also have more than two measuring tubes, such as, for example, four measuring tubes, which are connected for parallel flow relative to one another. In such case, in industrial applications, the situation can occur that in the case of such Coriolis flow measuring devices, (at least) one of the measuring tubes becomes completely or partially plugged. This case arises especially when a high-viscosity medium, an inhomogeneous medium and/or a medium tending to form accretions is flowing in the relevant pipeline.

Such a plugging of only a subset of the measuring tubes is difficult to detect, since a flow is still enabled through the at least one remaining free measuring tube. Even in the case of complete plugging of only one measuring tube, the performing of a Coriolis mass flow measuring with the Coriolis flow measuring device is possible. A plugging of a measuring tube is especially not directly recognizable based on the particular mass flow value. It is, however, desirable to detect a plugging of a measuring tube in Coriolis flow measuring devices as reliably and early as possible. This need exists especially in the case of hygienically critical applications and/or in the case of applications, in which the medium conveyed in the relevant pipeline changes, and a mutual contamination should be prevented.

In the publication WO 2009/134268 A1, a flow measuring device is described, by which a deviation in a flow measuring device parameter is detectable. Such a deviation of a flow measuring device parameter can, among other things, be triggered by a plugging of a measuring tube. In the case of a described method, the temperature is registered at a first as well as at a second measuring tube of the flow measuring device, and a temperature gradient is ascertained therefrom. A deviation in a flow measuring device parameter is detected when the ascertained temperature gradient exceeds a limit value. In the case of an additional described method, a pressure drop is measured via the flow measuring device, and based on this measuring, an expected flow rate is calculated. This expected flow rate is compared with a flow rate actually measured in the flow measuring device. A deviation in a flow measuring device parameter is then detected when the expected flow rate deviates from the measured flow rate by more than a limit value.

SUMMARY OF THE INVENTION

Accordingly, an object of the present invention is to provide a method and a Coriolis flow measuring device via which a complete or partial plugging of a measuring tube of a Coriolis flow measuring device having a plurality of measuring tubes is detectable as reliably and as early as possible.

The object is achieved by a method for detecting complete or partial plugging of a measuring tube of a Coriolis flow measuring device, as well as by a Coriolis flow measuring device.

In the present invention, a method is provided for detecting complete or partial plugging of a measuring tube of a Coriolis flow measuring device, wherein the Coriolis flow measuring device is insertable into a pipeline and has a measuring transducer of vibration type having at least two measuring tubes connected for parallel flow. In such case, the Coriolis flow measuring device is flowed through by medium, and via the Coriolis flow measuring device, in the context of a Coriolis mass flow measuring, a total mass flow of the medium through the Coriolis flow measuring device is determined. The method includes the steps as follows:

A) measuring a subset flow value occurring in a subset of the measuring tubes;
B) comparing a subset flow value obtained from this measuring with a reference value to be expected for this subset, wherein the reference value is determined from the total mass flow determined in the context of the Coriolis mass flow measuring; and
C) detecting plugging of at least one measuring tube of the measuring transducer, if the subset flow value deviates from the reference value by more than a limit value.

As is explained above, a plugging of a measuring tube can often not be detected solely based on the determined total mass flow through the Coriolis flow measuring device, so long as at least one further measuring tube still allows a flow. The consequence of a complete or partial plugging of at least one measuring tube is, however, that flows of different strengths (especially different flow rates with respect to the respective free cross sections of the measuring tubes) occur in the different measuring tubes. Via the method of the invention, such an occurrence of flows of different strengths within the individual measuring tubes is detected. Since, in addition to the determining of the total mass flow (as is usual in the case of Coriolis flow measuring devices), another subset flow occurring in a subset of the measuring tubes is measured, a subset flow value obtained from this measuring can be compared with a reference value to be expected for this subset, wherein the reference value is determined from the total mass flow determined in the context of the Coriolis mass flow measuring. If the subset flow value deviates markedly from the reference value to be expected (i.e. by more than a limit value), this then indicates that an unequal distribution of the flow in the measuring tubes caused by a plugging of at least one measuring tube is present. The method of the invention accordingly enables a complete or partial plugging of at least one measuring tube to be detected in a reliable and simple manner.

In connection with the present invention, it is sometimes mentioned that "at least one" component is provided. In the case of these components, during the course of additional discussions herein, it is intended that the possibility of the provision of more than one component is understood, even when such is not explicitly mentioned each time.

The method of the invention relates to a Coriolis flow measuring device with a measuring transducer of vibration type. A measuring transducer of vibration type generally serves, in such case, to produce mechanical reaction forces, e.g. mass flow dependent, Coriolis forces, density dependent, inertial forces and/or viscosity dependent, frictional forces in a medium flowing through. These mechanical reaction forces, in turn, are registerable via sensor. A typical manner of operation of such a Coriolis flow measuring device is described as follows: All (here, at least two) measuring tubes are excited by at least one exciter to execute mechanical oscillations. In such case, especially the fundamental mode of bending oscillations can be excited. Additionally, the mechanical oscillations of the measuring tubes are registered by at least one (as a rule, by at least two, spaced along the direction of elongation of the measuring tubes) oscillation sensor(s). The measuring signals provided by the at least one oscillation sensor are evaluated by an electronics of the Coriolis flow measuring device. The operating of the exciter occurs, as a rule, likewise via the electronics.

The total mass flow through the Coriolis flow measuring device can, for example, as is explained in the following, be determined in the context of a Coriolis mass flow measuring. If the measuring tubes are not flowed through by medium, upon excitation of the measuring tubes to execute mechanical oscillations, they oscillate in phase (along their respective directions of elongation). If the measuring tubes are flowed through by a medium (with a flow velocity greater than zero), this then leads to the measuring tubes being supplementally (along their direction of elongation) deformed due to the Coriolis force acting on the flowing medium. This phase shift occurring along the direction of elongation of the measuring tubes can be registered by the at least one oscillation sensor. For example, at least two oscillation sensors arranged spaced apart from one another along the direction of elongation of the measuring tubes can be provided, which in each case register the distance between two measuring tubes oscillating essentially opposite phase relative to one another. The phase shift occurring along the direction of elongation of the measuring tubes is proportional to the total mass flow through the Coriolis flow measuring device. Depending on the form of the Coriolis flow measuring device, a density and/or a viscosity of the flowing medium can also be determined with the device. For determining the density of the medium, the principle is utilized, that the resonance frequency (for example of the fundamental mode of the bending oscillation) depends on the oscillating mass, and therewith on the density of the flowing medium. In a further development, the Coriolis flow measuring device includes two measuring tubes, which extend mirror symmetrically to one another with respect to a symmetry plane, which extends between the two measuring tubes. It should also be pointed out that the two measuring tubes preferably are embodied mirror symmetrically to one another, and they especially have the same (free) flow cross section.

By a "complete plugging" of a measuring tube is meant a state, in which no more flow is possible through the measuring tube in question. By a "partial plugging" of a measuring tube is meant a state, in which the flow through the measuring tube in question is reduced. A partial plugging can be formed, for example, by a layer formation or by deposits of the medium within the relevant measuring tube. If, in the present relationship, a general "plugging" is referred to, reference is in such case made to both the possibility of a complete, as well as also of a partial plugging.

The "medium" can be completely or also only partially formed by a liquid, a gas or a mixture of liquid and gas. The liquid, the gas or the mixture of liquid and gas can especially also entrain solid particles (for example, pneumatically transported dust, solid particles in gas, solid particles in liquid, etc.).

The "subset of the measuring tubes" is, according to a further development, formed by exactly one measuring tube. In the case of the following description, especially in the case of designating "at least one measuring tube, which forms the subset", reference is in each case also made to this variant, even when this is not explicitly mentioned each time. According to a further development, it is provided that the "subset of the measuring tubes" is formed by exactly one measuring tube, and that the Coriolis flow measuring device has a total of two measuring tubes. Alternatively, the "subset of the measuring tubes" can, however, also be formed by a number of measuring tubes of a still greater number of measuring tubes of the Coriolis flow measuring device. For example, the subset of the measuring tubes can also be formed by two measuring tubes, while the Coriolis flow measuring device has a total of four measuring tubes. Additionally, as is explained below using the example of a further development, it can also not be fixed beforehand which measuring tube or which measuring tubes form the "subset of the measuring tubes" for which the step of measuring (step A)) is performed.

In the case of the step of "measuring" (step A)), a measured variable is measured, which is characteristic for the flow occurring in the subset of the measuring tubes (subset flow). This measured variable can, depending on the type of measuring method and depending on the embodiment of the step of comparing, be formed, for example, by a mass flow of the medium through the subset of the measuring tubes, a flow velocity of the medium through the at least one measuring tube forming the subset, a volume flow of the medium through the subset of the measuring tubes, a duration of time, which a localized contamination requires for passing through a measuring tube, etc. The step of measuring (step A)) occurs according to a further development directly at or in the at least one measuring tube which forms the subset. Alternatively, the subset flow can also be measured in the immediate vicinity of the at least one measuring tube which forms the subset. If the subset of the measuring tubes is formed by more than one measuring tube, the flow need not absolutely be measured separately for each of these measuring tubes. Rather, the total flow through this subset of the measuring tubes can also be measured. This would, for example, be the situation in the case of a Coriolis mass flow measuring in two measuring tubes for determining a mass flow through these two measuring tubes, in the case of a Coriolis flow measuring device which has a total of four measuring tubes.

The "subset flow value" which is taken into consideration in the step of "comparing" (step B)) need not be absolutely identical to the measured variable registered in the step of "measuring" (step A)). The subset flow value can especially be formed by a variable derived from the registered measured variable, such as, for example, by a mass flow through a measuring tube derived from the flow velocity of the medium through this measuring tube. The subset flow value is, in such case, likewise characteristic for the flow occurring in the subset of the measuring tubes (subset flow).

The "reference value to be expected for this subset" is especially determined from the determined total mass flow, referencing the ratio of the free (i.e. without taking into consideration a plugging in given cases present) flow cross section of the subset of the measuring tubes to the free flow cross section of all measuring tubes. If the measuring tubes in each case have an identical free flow cross section, this ratio can simply be formed by the number of the measuring tubes in the subset to the total number of the measuring tubes. The "reference value to be expected for this subset" need not in such case absolutely be formed from a mass flow to be expected for this subset. Rather, this reference value can be formed by a variable derived from the mass flow. The reference value is, in such case, characteristic for the flow to be expected in the subset of the measuring tubes, based on the total mass flow.

For the subset flow value as well as for the reference value, especially physical variables directly comparable with one another are used. In a corresponding manner, in the step of comparing (step B)), other variables which are obtainable by transforming mathematical equations can also be used as the subset flow value and as the reference value.

The Coriolis mass flow measuring (for determining the total mass flow) can, in such case, be performed parallel to or also offset in time (by a short time interval) from the step of measuring (step A)). Some measuring methods for registering the subset flow allow a parallel (i.e. at the same time) performing of the Coriolis mass flow measuring for determining the total mass flow.

The limit value can especially be a limit value stored in the Coriolis flow measuring device. It can, in such case, be a fixed value. Alternatively, the limit value can also be determined as a function of other variables, such as, for example, an actual total mass flow of the medium through the Coriolis flow measuring device, the medium itself and/or the respective application, etc. The limit value can also be adjustable by a user, depending on desired sensitivity.

If, in the case of step C), a plugging of at least one measuring tube of the measuring transducer is detected, this can, for example, be signaled to a user (e.g. via an on-site display on the Coriolis flow measuring device) and/or to a superordinated control unit connected via a network, this control unit performing a process control and/or a monitoring of a plurality of field devices connected in communication with one another.

The method can be put into practice independently of the particular shape and number (at least two) of the measuring tubes and of the oscillation mode in each case excited. In a further development, it is provided that the method of the invention is performed periodically, especially in predetermined time intervals. For example, the method is started automatically by the electronics after the expiration of a predetermined duration of time.

In a further development, the method includes the following step(s):
D) detecting plugging within the subset of the measuring tubes, when the subset flow value deviates from the reference value in such a manner, that a reduced subset flow (in comparison to an expected subset flow value) is present in the subset; and/or
E) detecting plugging of at least one measuring tube of the Coriolis flow measuring device which is not contained in the subset of the measuring tubes, when the subset flow value deviates from the reference value in such a manner, that an increased subset flow (compared to an expected subset flow value) is present in the subset.

In the case of this further development, it is thus determined as a function of the direction of the deviation between the subset flow value and the reference value to be expected whether (at least) one measuring tube within the subset is plugged, or whether at least one measuring tube of the remaining measuring tubes is plugged. If the subset is formed by exactly one measuring tube, a plugging of this measuring tube is thus detected in step D. If the subset is formed by exactly one measuring tube and the Coriolis flow measuring device has a total of two measuring tubes, a plugging the of other measuring tube not forming the subset is then detected in step E.

In a further development, in the step of measuring (step A)), a flow velocity of the medium in the subset of the measuring tubes is registered. The relationship between the flow velocity and the mass flow required for the step of comparing (step B)) can be produced referencing the ratio of the free flow cross section (i.e. without taking into consideration a plugging in given cases present) of the subset of the measuring tubes to the free flow cross section all measuring tubes, as well as the (known) density of the medium. If the subset of the measuring tubes is formed by exactly one measuring tube, especially the flow velocity of the flow within this measuring tube is registered. If the subset of the measuring tubes is formed by a number of measuring tubes, the flow velocity is then especially registered in each of the measuring tubes of the subset, and therefrom, a subset flow value to be taken into consideration for the step of comparing is determined.

In a further development, in the step of measuring (step A)), the time is registered, over which a localized contamination passing through a measuring tube brings about a disturbance in a measurement signal registered by the Coriolis flow measuring device. A localized contamination is, for example, formed by a gas bubble entrained in liquid or by a solid body entrained in liquid and/or gas. The registered duration of time is, conversely, proportional to the flow velocity of the localized contamination in the relevant measuring tube. Via this registering, a measure for the flow velocity of the medium within the measuring tube through which the localized contamination has passed is thus determined. In such case, the fact is utilized, that during the time in which a localized contamination passes through the Coriolis flow measuring device, a disturbance is brought about in a measurement signal registered by the Coriolis flow measuring device. This disturbance is especially caused by the density difference between the localized contamination and the medium.

The measurement signal of the Coriolis flow measuring device, which is taken into consideration relative to the time registration of such a disturbance, is especially formed by a measurement signal measured and/or processed in the Coriolis flow measuring device. The measurement signal is especially formed by a measurement signal in the context of the Coriolis mass flow measuring of the total mass flow measured or processed in the Coriolis flow measuring device, in the context of a density measurement of the medium and/or in the context of a viscosity measurement of the medium. For example, the measurement signal is formed by a total mass flow determined in the Coriolis flow measuring device, a mass in the Coriolis flow measuring device integrated over time, a resonance frequency determined in the Coriolis flow measuring device, or by an attenuation, or damping, determined in the Coriolis flow measuring device, etc. As is known in the technical field, the attenuation, or damping, is defined as the ratio of an excitation input variable, which is a measure for the excitation of the measuring tubes by the at least one exciter, to a sensor response variable, which is a measure for the oscillation caused by the excitation. The attenuation is especially given by the ratio of an electrical excitation current delivered to the exciter to the amplitude of the deflection of the oscillation sensor.

At which point in time and through which measuring tube of the Coriolis flow measuring device a localized contamination passes cannot, as a rule, be influenced. Preferably, the electronics of the Coriolis flow measuring device includes a detection mechanism, via which the passing of a localized contamination is recognized automatically, and via which the measuring of the time over which the contamination brings about a disturbance in a measurement signal registered by the Coriolis flow measuring device is automatically started.

When passing through a measuring tube, the localized contamination does not necessarily have the same flow velocity as the medium within this measuring tube. The flow velocity of the localized contamination is, apart from the flow velocity of the medium within the measuring tube, especially influenced by the density difference between the medium and the localized contamination as well, as by the orientation and shape of the respective measuring tubes.

In a further development, stored in the Coriolis flow measuring device for different total mass flow values are corresponding durations of time over which a localized contamination passing through a measuring tube brings about a disturbance in a measurement signal registered by the Coriolis flow measuring device in the case of a completely free measuring tube arrangement. Used in the step of comparing (step B)) as the reference value to be expected is the stored duration of time which corresponds to the total mass flow of the medium determined by the Coriolis flow measuring device. The stored duration of time can, for example, be determined beforehand via experimentation with the relevant medium and with corresponding localized impurities arising therein. In a corresponding manner, the limit value to be taken into consideration for the step of detecting (step C)) can also be determined beforehand via experiment.

In a further development, in the step of measuring, in the case of a subset of the measuring tubes, a Coriolis mass flow measuring is performed, and a mass flow of the medium through this subset of the measuring tubes is measured as a subset flow. For this subset of the measuring tubes, which especially is formed by exactly one or by two measuring tubes, a separate Coriolis mass flow measuring system (or a separate measuring arrangement) can be provided. In given cases, however, also parts of the Coriolis mass flow measuring system (or the measuring arrangement) via which a total mass flow through the Coriolis flow measuring device is determined can be utilized additionally.

In a further development, in the step of measuring (step A)), within at least one measuring tube, the flow velocity of the medium is measured via an ultrasound measuring method. In such case, especially ultrasound measuring methods and measuring arrangements known from the state of the art can be applied.

Alternatively, for the measuring of the subset flow arising in a subset of the measuring tubes, alternative measuring methods (compare step A)) can also be applied. For example, at least one bendable element protruding into the flow can also be used, wherein the element is bent due to the flow of the medium, and wherein the degree of bending is registered. Such an element can be arranged in a measuring tube or directly upstream from the relevant subset of the measuring tubes.

In a further development, the steps of measuring (step A)), comparing (step B)) and detecting (step C)) are performed in the Coriolis flow measuring device. For this, especially a correspondingly embodied electronics is provided in the Coriolis flow measuring device. Fundamentally, however, it is also possible that parts of the method of the invention are performed in a superordinated control unit, which is in communicative connection with the Coriolis flow measuring device via a network, or they are controlled from this control unit.

In a further development, the steps of measuring (step A)), comparing (step B)) and of detecting (step C)) are performed in parallel with a flow measurement performed in the Coriolis flow measuring device of the total flow of the medium through the Coriolis flow measuring device. A flow measurement thus need not be interrupted for performing the detection method of the invention. The flow measurement of the total flow is especially formed by a Coriolis mass flow measuring of the total mass flow of the medium through the Coriolis flow measuring device. The flow measurement of the total flow can also be formed by a density measurement and/or a viscosity measurement. As already explained above, it is not absolutely required that the total mass flow required for determining the reference value to be expected occurs exactly at the same time as the measuring of the subset flow. A registering of the total mass flow and the subset flow at the same time or close in time is, however, advantageous with respect to preventing additional effects due to time changes.

In a further development, in the case in which a plugging of at least one measuring tube of the measuring transducer is detected, this plugging is signaled to a user and/or to a control unit in communicative connection with the Coriolis flow measuring device. A signaling to a user can occur, for example, via an on-site display of the Coriolis flow measuring device and/or via a signal tone of the Coriolis flow measuring device. In plants of process automation technology, the control unit is, as a rule, in communicative connection with the Coriolis flow measuring device (and, as a rule, also with additional field devices) via a network (e.g. a fieldbus network). With respect to the field devices associated with it, the control unit can, in such case, for example perform a process control and/or process monitoring.

The present invention additionally relates to a Coriolis flow measuring device, which is insertable into a pipeline, which has a measuring transducer of vibration type having at least two measuring tubes connected for parallel flow, and which is embodied in such a manner, that through this, in the context of a Coriolis mass flow measuring, a total mass flow of a medium flowing in the pipeline is determinable. Additionally, via the Coriolis flow measuring device, a subset flow occurring in a subset of the measuring tubes is measurable. An electronics of the Coriolis flow measuring device is embodied in such a manner, that via the electronics, a subset flow value obtained from this measuring can be compared with a reference value to be expected for this subset, wherein the reference value is determined from the total mass flow determined via the Coriolis flow measurement, and that via the electronics, a plugging of at least one measuring tube of the measuring transducer is detectable, if the subset flow value deviates from the reference value by more than a limit value.

The further developments and variants explained above in reference to the method of the invention are also implementable in corresponding manner in the Coriolis flow measuring device of the invention. In the case of the above explained method steps, in so far as this is technically possible, the electronics of the Coriolis flow measuring device is especially embodied for performing the corresponding step and/or for operating a corresponding functional unit (of the Coriolis flow measuring device) for performing the step. The electronics can, in such case, work in a digital and/or analog manner.

In a further development, in addition to a Coriolis mass flow measuring system (or a Coriolis mass flow measuring arrangement) for measuring the total mass flow of the medium flowing in the pipeline, the Coriolis flow measuring device includes a second measuring system (or a second measuring arrangement) for measuring the subset flow arising in the subset of the measuring tubes. In a further development, the second measuring system includes at least one of the following measuring systems: A Coriolis mass flow measuring system for measuring the mass flow of the medium in the subset of the measuring tubes; and/or an ultrasound measuring system for measuring the flow velocity of the medium within a measuring tube. As is explained above, the second measuring system can, however, also be formed by some other measuring system, via which a subset flow occurring in a subset of the measuring tubes is registerable.

BRIEF DESCRIPTION OF THE DRAWINGS

Other advantages and utilities of the invention will become evident based on the following description of forms of embodiment with reference to the appended drawing. The figures of the drawing show as follows:

FIG. 2 is a side view of the Coriolis flow measuring device illustrated in FIG. 1, with partially removed housing;

DETAILED DISCUSSION IN CONJUNCTION WITH THE DRAWINGS

Figure 1:
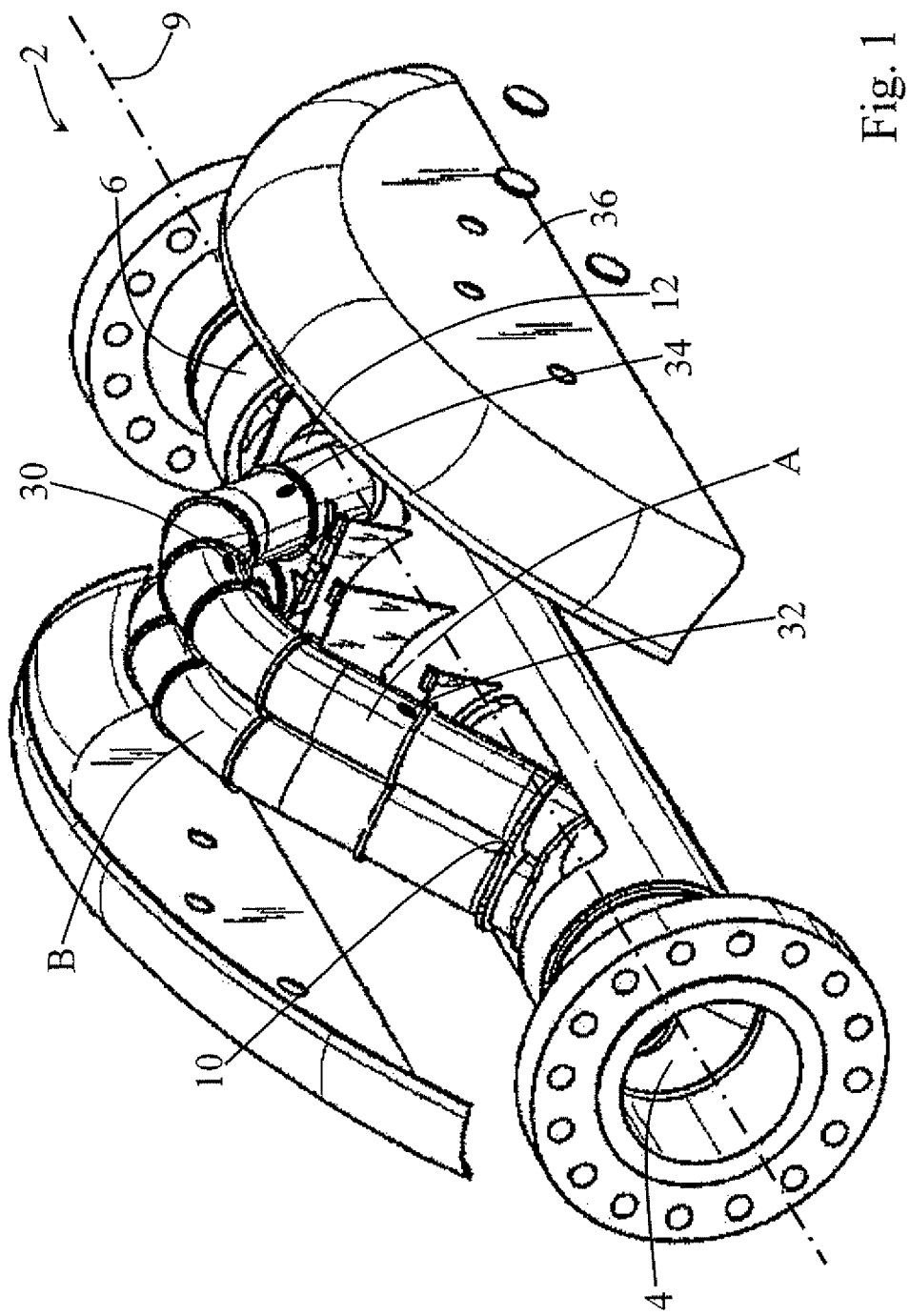
FIG. 1 is a schematic representation of a Coriolis flow measuring device in perspective view, with partially removed housing for illustrating a form of embodiment of the present invention.

In FIGS. 1 and 2, there is presented, by way of example, a Coriolis flow measuring device 2, which is embodied for performing the detection method of the invention. The Coriolis flow measuring device 2 includes two measuring tubes A and B held in an oscillatable manner. Each tube has a curvature. The tubes extend parallel to one another. Coriolis flow measuring device 2 is in such case insertable into a pipeline (not shown) in such a manner that the two measuring tubes A and B are flowed through by the medium flowing in the pipeline. For this, Coriolis flow measuring device 2 has, on the inlet side, a flow divider 4, via which the medium is divided between the two measuring tubes A and B. On the outlet side, a flow divider 6 is provided in a corresponding manner, via which the medium emerging from the two measuring tubes A and B is led together again, and is led to an outlet of Coriolis flow measuring device 2.

Between the two measuring tubes A and B extends an exciter 8, which, in the present example of an embodiment is an electrodynamic exciter 8. The exciter 8 is in the present example of an embodiment arranged on a peak of the arc formed in each case by the two measuring tubes A and B. The exciter 8 is embodied in such a manner that its length is changed via application of an electrical excitation voltage. Via application of a corresponding periodic electrical excitation voltage on the exciter 8, the two measuring tubes A and B can periodically be pushed apart and/or drawn together, so that they execute bending oscillations. In such case, the two measuring tubes A and B are excited with opposite phase relative to one another, and in each case execute a swinging movement (opposite phase relative to one another) about a longitudinal axis 9 of the Coriolis flow measuring device 2. The two measuring tubes A and B are additionally mechanically coupled to one another on the inlet side and on the outlet side by corresponding coupling elements 10, 12.

Between the two measuring tubes A and B, respectively, at an inlet side and at an outlet side section of such, extend two oscillation sensors 14, 16, via whose length change, mechanical oscillations of the two measuring tubes A and B are registerable. In the present example of an embodiment, via the two oscillation sensors 14, 16, the distance change between the two measuring tubes A, their combined amplitude—is registerable in each case. The oscillation sensors 14, 16 are formed, for example, by electrodynamic oscillation sensors. The evaluation of the measuring signals provided by oscillation sensors 14, 16, as well as the operating of exciter 8, occurs via a correspondingly embodied electronics 18, which is only schematically shown by a box in FIG. 2. The operating of the exciter 8 by the electronics 18 is schematically presented in FIG. 2 by the arrow 24, while the providing of the measuring signals by oscillation sensors 14, 16 to electronics 18 in FIG. 2 is schematically presented by the arrows 26, 28.

During use, a mass flow of the medium flowing in the respective pipeline is determinable via the Coriolis flow measuring device 2. In the case of the present form of embodiment of the Coriolis flow measuring device 2, via the two oscillation sensors 14, 16, the distance (in the case of oscillations, varying over time) between the two measuring tubes A, B is in each case registered at the inlet side and at the outlet side. Due to the Coriolis force acting on the flowing medium, a phase shift occurs along the direction of elongation of measuring tubes A, B. Due to oscillation sensors 14, 16 being arranged on the inlet side and outlet side, this phase shift is registered by oscillation sensors 14, 16. From the registered phase shift, the total mass flow of the medium through the Coriolis flow measuring device 2 can then be ascertained via electronics 18. The Coriolis flow measuring device 2 is embodied in such a manner that through this, a density as well as a viscosity of the flowing medium also are determinable.

In the case of high viscosity media and/or those tending to form accretions, it can occur that one of the measuring tubes A, B becomes completely or partially plugged. So long as a(n accordingly increased) flow is still possible through the remaining measuring tube A or B, a plugging of a measuring tube A or B is not recognizable in the context of the Coriolis mass flow measuring of the total mass flow. In order to be able to perform the detection method of the invention for detecting plugging of a measuring tube A, B, in addition to the total mass flow through Coriolis flow measuring device 2, a subset flow occurring in one of the measuring tubes is also measured. The shown Coriolis flow measuring device 2 is embodied essentially mirror symmetrically to a symmetry plane extending between the two measuring tubes A, B. Especially, the two measuring tubes A, B are embodied mirror symmetrically to one another relative to this symmetry plane. They have, in each case, the same free flow cross section. Accordingly, in the case of a free (i.e. unplugged) measuring tube arrangement, the flow is distributed uniformly (i.e. in a ratio of 1:1) between the two measuring tubes A, B. If one of the measuring tubes A, B is (completely or partially) plugged, the flow through the plugged measuring tube is then reduced in comparison to the flow through the unplugged measuring tube. Such a flow distribution deviating from the flow distribution to be expected can be detected by measuring the subset flow occurring in one of the measuring tubes A, B.

In the following, different forms of embodiment of the invention, in the case of which especially different measuring methods for measuring such a subset flow are applied, are explained by way of example.

In one form of embodiment, in the case of a measuring tube—in the present form of embodiment, in the case of measuring tube A—a Coriolis mass flow measuring of the mass flow through this measuring tube A is performed. Accordingly, a mass flow of the medium through this subset of the measuring tubes is measured as the subset flow. For this, in the case of the present form of embodiment, an exciter 30, as well as sensors 32, 34, respectively on the inlet side and outlet side, are provided on this measuring tube A. The exciter 30 is, in such case, supported on the other side on a housing component 36 (in FIG. 1 illustrated partially removed). Also the two oscillation sensors 32, 34 in each case measure the distance between the measuring tube A and the housing component 36. Correspondingly, as was explained above in reference to exciter 8 and the two oscillation sensors 14, 16, exciter 30 is also operated by electronics 18, and the measuring signals of the two oscillation sensors 32, 34 are evaluated by the electronics 18. During performance of the Coriolis mass flow measuring of the mass flow through the measuring tube A, in the case of the present form of embodiment, only the measuring tube A is excited to oscillations by the exciter 30, while the exciter 8 is not activated.

In the case of the present form of embodiment, the subset flow value is formed by the mass flow through the measuring tube A determined by the Coriolis mass flow measuring (with the measuring arrangement formed from exciter 30 and oscillation sensors 32, 34). The reference value to be expected is equal to half of the total mass flow of the medium through the Coriolis flow measuring device 2, determined in the context of the Coriolis mass flow measuring (with the measuring arrangement formed from exciter 8 and oscillation sensors 14, 16). The subset flow value and the reference value to be expected are determined from the respective measured values and compared with one another via the electronics 18. If the subset flow value deviates significantly from the reference value to be expected, especially by more than a predetermined limit value, a plugging of a measuring tube is then detected. Based on the direction of the deviation of the subset flow value from the reference value to be expected, it is additionally determined via electronics 18 which of the measuring tubes A, B is plugged. If a plugging of a measuring tube is detected, this is then signaled to a user via an on-site display (not shown in the Figs.) provided on Coriolis flow measuring device 2. Additionally, a control unit (not shown) in communicative connection with the Coriolis flow measuring device 2 is informed about this.

In the following, other forms of embodiment of the invention are explained, wherein primarily the differences in comparison to the first form of embodiment explained above are explored. In the case of the second form of embodiment, in parallel with the Coriolis mass flow measuring of the total mass flow (with the measuring arrangement formed from exciter 8 and oscillation sensors 14, 16), the time is registered, over which a localized contamination passing through a measuring tube brings about a disturbance in a measurement signal registered by the Coriolis flow measuring device 2. The measuring arrangement for determining the mass flow through a measuring tube shown in FIG. 1, which is formed from exciter 30 and oscillation sensors 32, 34, is not required in the case of the second form of embodiment. In the case of the second form of embodiment, the effect is utilized that in the case in which a measuring tube is plugged, the flow velocity in the remaining measuring tube is increased, and a localized contamination therewith passes through the remaining measuring tube faster.

Figure 3A:
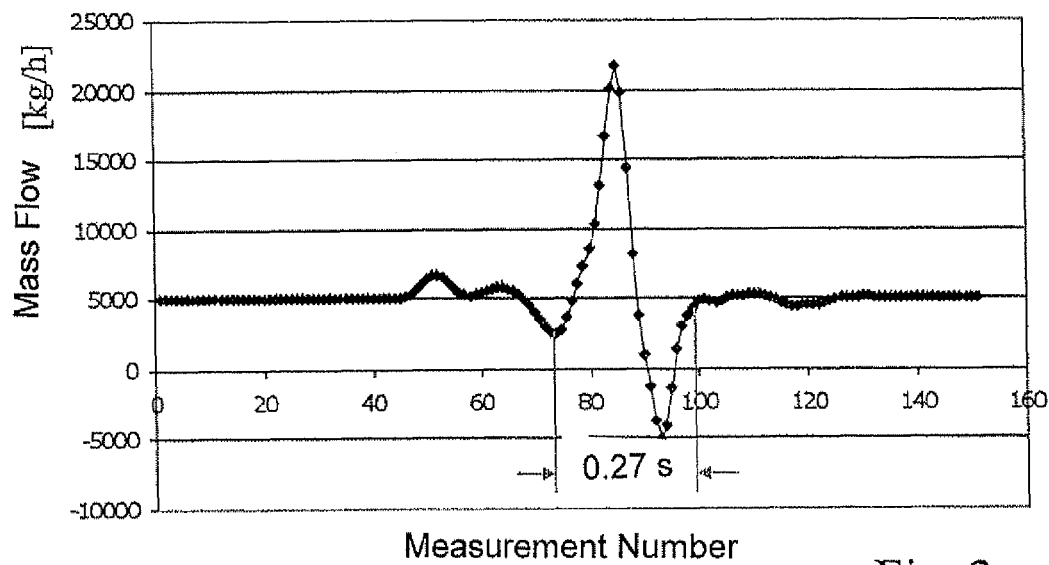
FIG. 3a is a graphical plotting of a time dependent, mass flow registered by a Coriolis flow measuring device, for illustrating a disturbance caused by a localized contamination, in a state in the case of which all measuring tubes are free.
Figure 3B:
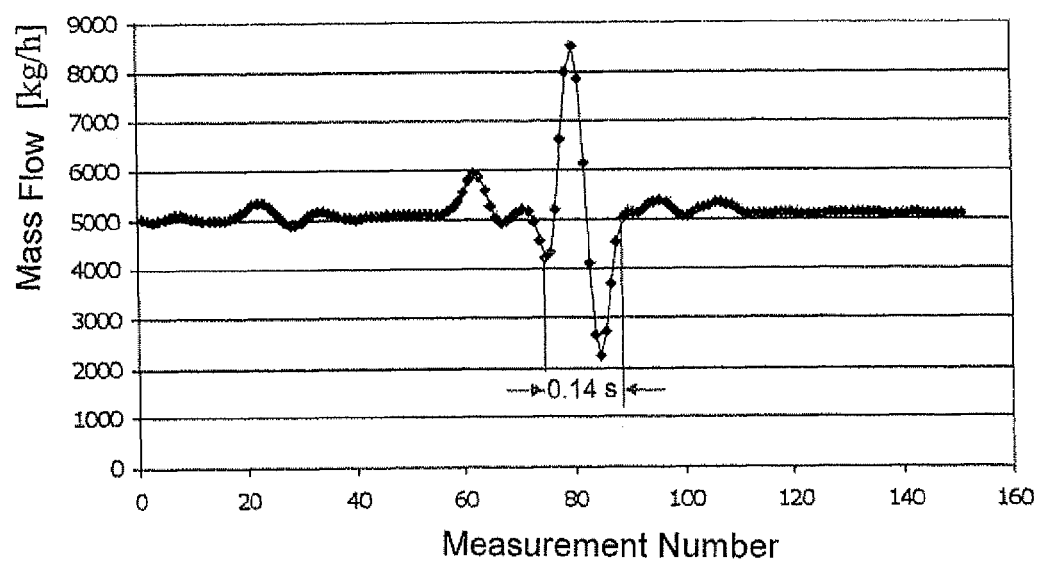
FIG. 3b is a graphical plotting of a time dependent, mass flow registered by a Coriolis flow measuring device, for illustrating a disturbance caused by a localized contamination, in a state in the case of which a measuring tube is plugged.

This effect is evident from FIGS. 3a and 3b. In FIGS. 3a and 3b, a total mass flow (i.e. total mass flow rate) determined in the Coriolis flow measuring device 2 (with the measuring arrangement formed from exciter 8 and oscillation sensors 14, 16) is in each case plotted versus time. In such case, the individual measurement points registered at equal time intervals are plotted along the x-axis, while the determined total mass flow is plotted along the y-axis in the unit kg/h. (kilogram/hour). In the case of the experimental arrangement used for the measurements of FIGS. 3a and 3b, the flowing medium was water, which flowed in the relevant pipeline with a total mass flow of 5,000 kg/h. The localized contamination is, in each case, formed by an air bubble, which is carried in the flowing medium (here: water) and which passes through one of the measuring tubes. As is evident from FIGS. 3a and 3b, in the case of passing through the measuring tube, the localized contamination causes—apart from slight disturbances occurring earlier and thereafter—first a significant rise of the total mass flow measurement signal, then a significant falling until markedly below the actual total mass flow value (of essentially 5.000 kg/h), and then a rise back up until the actual total mass flow value (of essentially 5.000 kg/h) is reached again. This curve of the total mass flow measurement signal is characteristic for the passing of a localized contamination through a measuring tube, especially a localized contamination, which has a smaller density than the flowing medium. In such case, the curve section of the total mass flow measurement signal above the actual total mass flow value (of 5.000 kg/h) corresponds to the duration of time, in which the localized contamination passed through the first half of the measuring tube (i.e. essentially from an inlet of the measuring tube up to its reaching the position of the exciter 8). The curve section of the total mass flow measurement signal below the actual total mass flow value (of 5.000 kg/h) corresponds to the duration of time, in which the localized contamination passed through the second half of the measuring tube (i.e. essentially from the position of the exciter 8 up to its reaching an outlet of the measuring tube).

The duration of time from the beginning of the significant rising the total mass flow measurement signal through the significant falling up to the reaching of the original value of the total mass flow measurement signal is, in the case of the present form of embodiment, taken into consideration as the time over which a localized contamination passing through a measuring tube brings about a disturbance in a measurement signal registered by the Coriolis flow measuring device 2 (here the total mass flow measurement signal). In the case of the experimental arrangement used for the FIG. 3a, the flow cross section of all measuring tubes was free. The measured duration of time amounted, in this case, to 0.27 seconds, as is schematically presented in FIG. 3a. In the case of the experimental arrangement used for FIG. 3b, a measuring tube was completely plugged by a rubber plug. Accordingly, the flow velocity in the remaining measuring tube was markedly increased, which leads to a markedly shorter time which a localized contamination (here the air bubble) required for passing through the measuring tube. In the present case, a duration of time of 0.14 seconds was measured.

In the case of application of the second form of embodiment, in an experimental arrangement with the relevant medium (here water), it is preferably first determined for different total mass flow values the corresponding duration of time over which a localized contamination passing through a measuring tube (here an air bubble) brings about a disturbance in a measurement signal registered by the Coriolis flow measuring device in the case of completely free measuring tube arrangement. These durations of time are (together with the associated total mass flow value) stored in a memory (not shown in the figures) of Coriolis flow measuring device 2.

During use, in the Coriolis flow measuring device 2, the measurement signal (here the total mass flow measurement signal) is monitored for the occurrence of a disturbance brought about by a localized contamination. If is such a disturbance is detected, then, as is described above, the time is registered over which the localized contamination brings about a disturbance in the measurement signal in the case of passing through a measuring tube. This duration of time is taken into consideration as the subset flow value. Additionally, based on the Coriolis mass flow measuring of the total mass flow performed in parallel in the Coriolis flow measuring device 2, the stored duration of time which corresponds to the measured total mass flow value is taken into consideration as the reference value to be expected. The subset flow value and the reference value to be expected are, in such case, determined by the electronics 18 and compared with one another. This comparison and the additional steps occur corresponding to the manner described above in reference to the first form of embodiment. In contrast to the first form of embodiment, in the method as claimed in the second form of embodiment, it cannot directly be detected, which of the measuring tubes A, B is plugged. This is because based on the measurement signal, it cannot, as a rule, be recognized through which measuring tube the localized contamination has passed.

Figure 4:
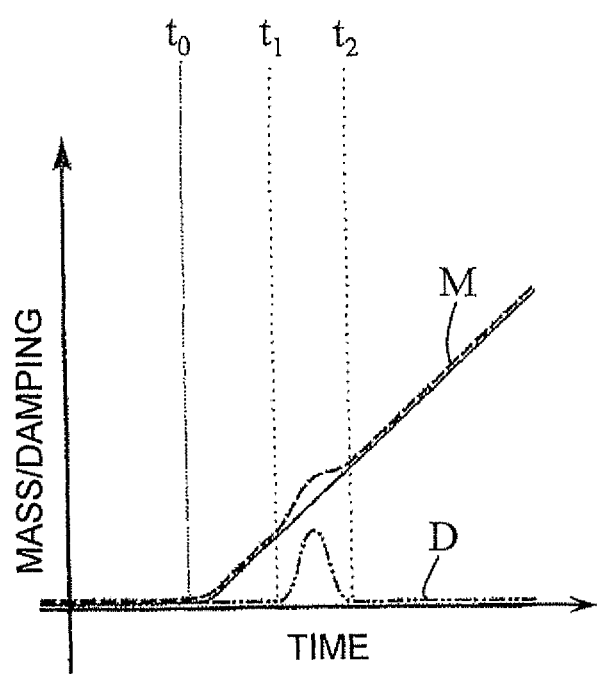
FIG. 4 is a schematic, graphical plotting of an integrated mass and an attenuation registered by a Coriolis flow measuring device, for illustrating a disturbance caused by a localized contamination.

As an alternative to the total mass flow measurement signal, other measuring signals measured and/or processed in the Coriolis flow measuring device 2 can also be taken into consideration for determining the duration of time over which a localized contamination passing through a measuring tube brings about a disturbance in the relevant measurement signal. This is schematically presented by means of FIG. 4. In FIG. 4, mass accumulated over time is schematically plotted versus the time and presented as a dashed line (the curve "M" in FIG. 4). This accumulated mass is often calculated by integration in Coriolis flow measuring devices for filling vats, containers, etc. Additionally, in FIG. 4, in a dashed-dotted line, attenuation/damping is plotted versus time (the curve "D" in FIG. 4). Both measuring signals can, in such case, for example be measured or processed by a Coriolis flow measuring device 2 of the type presented in FIGS. 1 and 2. For the two measuring signals, an expected curve is in each case presented as a solid line. In the duration of time from $t_1$ until $t_2$, a localized contamination, especially an air bubble, passed through a measuring tube. As is evident from FIG. 4, this is recognizable in the curve of the two measuring signals based on the peak in this region. Accordingly, for determining the duration of time which a localized contamination requires for passing through a measuring tube, the duration of time of the increasing of the measurement signal (compare the dashed or dashed-dotted line between the times $t_1$ and $t_2$) compared to the expected curve of the measurement signal (compare the solid line between the times $t_1$ and $t_2$) can be measured. This duration of time can then be made use of in the Coriolis flow measuring device 2 in a corresponding manner, as was explained above in reference to the total mass flow measurement signal.

The present invention is not limited to the examples of embodiments explained with reference to the figures. As an alternative to or in supplementation of the above described alternatives, other measuring methods—and, in given cases, measuring arrangements—can especially also be applied, in order to measure the subset flow occurring in a subset of the measuring tubes.

The invention claimed is:

1. A method for detecting complete or partial plugging of a measuring tube of a Coriolis flow measuring device, which is insertable into a pipeline, and which includes a measuring transducer of the vibration type including at least two measuring tubes connected for parallel flow; wherein a medium flows through the Coriolis flow measuring device, and wherein, via the Coriolis flow measuring device, in the context of a Coriolis mass flow measuring, a total mass flow of the medium through the Coriolis flow measuring device is determined, said method comprising:

measuring a subset flow occurring in a subset of the measuring tubes;

comparing a subset flow value obtained from said measuring with a reference value to be expected for this subset, wherein the reference value is determined from the total mass flow determined in the context of the Coriolis mass flow measuring; and detecting plugging of at least one measuring tube of the measuring transducer, if the subset flow value deviates from the reference value by more than a limit value.

2. The method as claimed in claim 1, wherein:

the subset of the measuring tubes is formed by exactly one measuring tube.

3. The method as claimed in claim 1, further comprising:

detecting plugging within the subset of the measuring tubes, when a deviation of the subset flow value from the reference value indicates that a reduced subset flow is present in the subset.

4. The method as claimed in claim 1, wherein:

said measuring said subset flow occurring in a subset of the measuring tubes includes: registering a flow velocity of the medium in the subset of the measuring tubes.

5. The method as claimed in claim 1, wherein:

said measuring said subset flow occurring in a subset of the measuring tubes includes: registering a time over which a localized contamination passing through a measuring tube brings about a disturbance in a measurement signal registered by the Coriolis flow measuring device.

6. The method as claimed in claim 5, wherein:

stored in the Coriolis flow measuring device for different total mass flow values are corresponding durations of time over which a localized contamination passing through a measuring tube brings about a disturbance in a measurement signal registered by the Coriolis flow measuring device in the case of completely free measuring tube arrangement; and in the step of comparing, the stored time duration which corresponds to the total mass flow of the medium determined by the Coriolis flow measuring device is used as the reference value to be expected.

7. The method as claimed in claim 1, wherein:

said measuring said subset flow occurring in a subset of the measuring tube includes:

performing a Coriolis mass flow measurement, and measuring a mass flow of the medium through this subset of the measuring tubes.

8. The method as claimed in claim 1 wherein
said measuring said subset flow occurring in a subset of the measuring tubes includes:
measuring the flow velocity of the medium within at least one of said measuring tubes via an ultrasound measuring method.

9. The method as claimed in claim 1, wherein in the Coriolis flow measuring device are performed:
said measuring said subset flow occurring in a subset of the measuring tubes,
said comparing said subset flow value obtained from said measuring with said reference value, and
said detecting plugging of at least one measuring tube of the measuring transducer.

10. The method as claimed in claim 1, wherein:
said measuring, comparing and detecting are performed in parallel with a flow measurement performed in the Coriolis flow measuring device of a total flow of the medium flowing through the Coriolis flow measuring device.

11. The method as claimed in claim 1, further comprising:
signaling, in the case in which a plugging of at least one measuring tube is detected by the measuring transducer, said plugging to at least one of: a user and a control unit in communicative connection with the Coriolis flow measuring device.

12. A Coriolis flow measuring device for providing a Coriolis mass flow measuring, said Coriolis flow measuring device being adapted to be inserted into a pipeline and to determine, in the context of the Coriolis mass flow measuring, a total mass flow of a medium flowing in said pipeline, and said Coriolis flow measuring device, comprising:
an electronics; and
a measuring transducer of a vibration type including at least two measuring tubes connected for parallel flow; wherein
the Coriolis flow measuring device is adapted to a measure a subset flow occurring in a subset of said measuring tubes; and
said electronics is adapted to compare a subset flow value obtained from this measurement with a reference value expected for this subset and determined from the total mass flow determined via the Coriolis flow measurement and
said electronics is adapted to detect a plugging of at least one of said measuring tubes of the measuring transducer, if the subset flow value deviates from the reference value by more than a limit value.

13. The Coriolis flow measuring device as claimed in claim 12,
further comprising: a measuring system for measuring the subset flow occurring in the subset of said measuring tubes.

14. The Coriolis flow measuring device as claimed in claim 13, wherein:
said second measuring system includes at least one of:
a Coriolis mass flow measuring system for measuring the mass flow of the medium in the subset of said measuring tubes; and
an ultrasound measuring system for measuring the flow velocity of the medium within a measuring tube.

15. The method as claimed in claim 1, further comprising: detecting plugging of at least one measuring tube of the Coriolis flow measuring device not contained in the subset of the measuring tubes, when a deviation of the subset flow value from the reference value indicates that an increased subset flow is present in the subset.

* * * * *